US010239613B2

(12) United States Patent
Boyk

(10) Patent No.: US 10,239,613 B2
(45) Date of Patent: Mar. 26, 2019

(54) SOLAR POWER TETHERED DRONE

(71) Applicant: AMERISTAR SOLAR, LLC, Banks, OR (US)

(72) Inventor: Sidney William Boyk, Banks, OR (US)

(73) Assignee: AMERISTAR SOLAR, LLC, Banks, OR (US)

( * ) Notice: Subject to any disclaimer, the term of this patent is extended or adjusted under 35 U.S.C. 154(b) by 0 days.

(21) Appl. No.: 15/873,051

(22) Filed: Jan. 17, 2018

(65) Prior Publication Data

US 2018/0208310 A1 Jul. 26, 2018

Related U.S. Application Data

(60) Provisional application No. 62/449,407, filed on Jan. 23, 2017.

(51) Int. Cl.

| | |
|---|---|
| ***H02S 10/40*** | (2014.01) |
| ***B64C 39/02*** | (2006.01) |
| ***H02S 40/38*** | (2014.01) |
| ***H02J 7/35*** | (2006.01) |
| ***H02S 20/30*** | (2014.01) |
| ***B64D 47/08*** | (2006.01) |

(52) U.S. Cl.

CPC .......... *B64C 39/024* (2013.01); *B64C 39/022* (2013.01); *B64D 47/08* (2013.01); *H02J 7/35* (2013.01); *H02J 7/355* (2013.01); *H02S 20/30* (2014.12); *H02S 40/38* (2014.12); *B64C 2201/042* (2013.01); *B64C 2201/127* (2013.01); *B64D 2211/00* (2013.01)

(58) Field of Classification Search

CPC ........................................................ H02S 10/40

See application file for complete search history.

(56) References Cited

U.S. PATENT DOCUMENTS

| | | | | |
|---|---|---|---|---|
| 6,396,239 | B1 * | 5/2002 | Benn | H02S 10/40 320/101 |
| 7,469,541 | B1 * | 12/2008 | Melton | H02S 10/40 60/641.1 |
| 8,378,620 | B2 * | 2/2013 | Reckelhoff | A61B 5/0002 320/101 |
| 2003/0070708 | A1 | 4/2003 | Stuart et al. | |
| 2010/0000592 | A1 | 1/2010 | Ko | |
| 2010/0102016 | A1 | 4/2010 | Davis | |
| 2011/0023925 | A1 | 2/2011 | Johnson et al. | |
| 2011/0146751 | A1 | 6/2011 | McGuire et al. | |
| 2011/0162691 | A1 | 7/2011 | Hartelius | |
| 2011/0300664 | A1 | 12/2011 | Chung | |
| 2012/0085387 | A1 | 4/2012 | French, Sr. | |
| 2012/0291847 | A1 | 11/2012 | Rowe, Jr. et al. | |
| 2013/0047978 | A1 | 2/2013 | Slocum et al. | |
| 2014/0137925 | A1 | 5/2014 | Boyk | |

(Continued)

*Primary Examiner* — Fritz M Fleming

(74) *Attorney, Agent, or Firm* — Miller Nash Graham & Dunn LLP

(57) ABSTRACT

A mobile, powered monitoring system includes an array of solar panels, a battery bank of at least one battery electrically connected to the array of solar panels, a landing and connection platform electrically connected to the battery bank, a cable electrically connected to the landing and connection platform, a drone electrically and mechanically connected to the cable, the drone having at least one camera, and a transmitter to allow images captured by the camera to be sent to a base station.

19 Claims, 5 Drawing Sheets

30
10
26
16
Solar Panels
28
32
20
12
24
Battery Bank
14
22
18

(56) References Cited

U.S. PATENT DOCUMENTS

| | | | | |
|---|---|---|---|---|
| 2014/0216549 | A1 | 8/2014 | Satoh et al. | |
| 2016/0083115 | A1* | 3/2016 | Hess | B64F 3/02 701/3 |
| 2016/0107750 | A1* | 4/2016 | Yates | B64C 39/024 244/2 |
| 2016/0120303 | A1* | 5/2016 | Constantino | F16M 11/42 108/28 |
| 2017/0225801 | A1* | 8/2017 | Bennett | B64F 1/222 |
| 2017/0302223 | A1 | 10/2017 | Boyk | |

* cited by examiner

SOLAR POWER TETHERED DRONE

CROSS REFERENCE TO RELATED APPLICATION

This application claims priority to and the benefit of U.S. Provisional Application No. 62/449,407, filed Jan. 23, 2017, which is incorporated herein by reference in its entirety.

BACKGROUND

Agricultural growers that raise crops outdoors face several challenges. For example, outside growers of high value crops have security concerns that inside growers do not have because outside fields have multiple entry points, adjacent areas that are hidden from view and may reside in remote locations. A second challenge lies in the costs of providing adequate security coverage of these areas. Most security recommendations involve adding cameras or other additional infrastructure to protect the hidden areas at considerable cost.

The third challenge makes up the largest problem for outside agricultural growers, now and in the future. The increasing electrical costs results in increasing regulations from utility companies and state agencies because of their huge electrical consumption. Coupled with the sometimes-remote locations of the growing fields, requiring investment in power infrastructure, the ability to acquire power 'off the grid' would alleviate some of these challenges.

Other remote sites without power may also have security or monitoring needs, such as remote storage facilities or intersections, forestry locations such as remote cabins, etc.

DETAILED DESCRIPTION OF THE EMBODIMENTS

Figure 1:
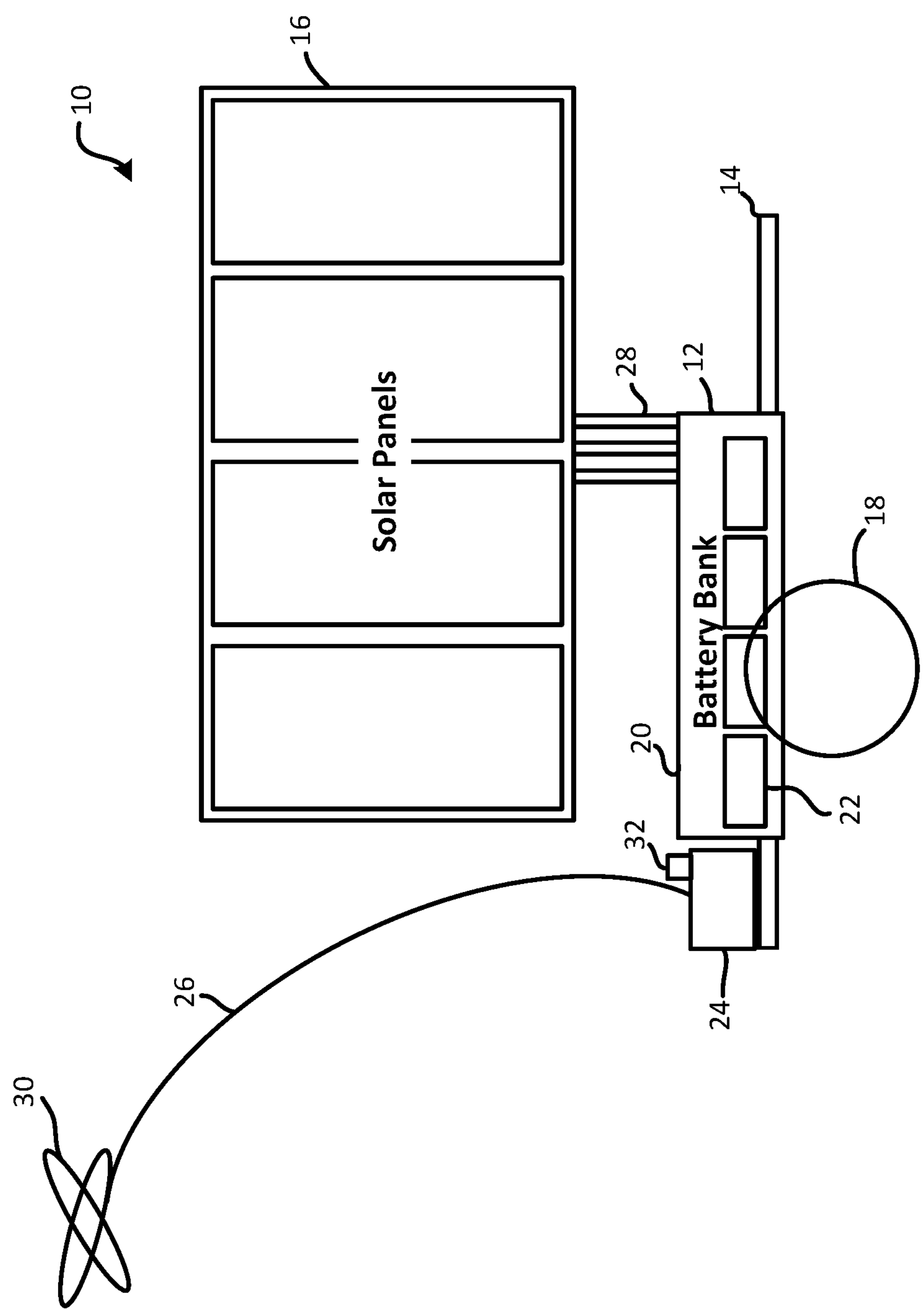
FIG. 1 shows an embodiment of a mobile solar recharging station with a tethered drone.

FIG. 1 shows an embodiment of a mobile solar recharging station with a tethered drone. The mobile recharging station may take many different forms, such as a towable, folding array of solar panels mounted on a towable trailer. An example of this platform may be a Gyrovolts® towable trailer as discussed in U.S. patent application Ser. No. 13/839,796, "Self-Leveling and Self-Aligning Solar Platform," filed March 2015, 2013, which is incorporated by reference in its entirety here. This may include the stealth and heat management system set out in U.S. patent application Ser. No. 15/293,606, "Solar Panel Stealth and Heat Management," which is also incorporated by reference in its entirety here.

In FIG. 1, the system 10 consists of a trailer 14 having a body 12 that may include a battery bank 20. The battery bank 20 may include multiple batteries 22. The trailer has an array 16 of foldable and stowable solar panels that can deploy into a flat array by an accordion-like unfolding process. The support 28 may be a piston or other movable element that allows the array to move up and down for more convenient storage. In the embodiment shown the mobile solar station is a towable trailer 14 on tires 18, but may be mounted to a truck or other movable platform. The solar panel array provides power to at least one battery in a battery bank 20.

The mobile solar platform includes a landing and connection platform 24. An unmanned vehicle (UAV) or 'drone' 38 tethers to the platform 24 by cable or tether 26. The tether takes power from the battery bank and transmits it to the drone. This solves one major problem for drones, the loss of power after 20-30 minutes of flight. In addition, the tether can provide a data link both up and down from the drone to a transmitter 32. The drone has at least one camera, as will be discussed later. Typically, the camera will be an infrared camera, or a CCD camera, and gathers image data about the grow site. The camera downloads the image data to the transmitter or other memory 32.

The tether 26 draws power from the battery bank or may draw it directly from the solar panels. Due to power fluctuations in the solar array, however, it may provide a steadier power flow to draw from the battery. Similarly, the landing and connection platform to which the tether connects may draw power from the battery bank. The tether also electrically connects to the drone and may provide both power and data, or may have two separate cables that run along a same cable or tether.

The transmitter 32 may have a data connection to a central site away from the grow field, such as a cellular or satellite link. Alternatively, or in addition, the component 32 may consist of a memory, a computer or other device that allows storage and possibly access to the image data for viewing by security personnel at the site. The drone may also contain other sensors, such as light sensors, thermometers, microphones, moisture sensors, etc.

While the embodiments here assume that the drone tethers to the charging station, it may also have the capability to untether itself, either autonomously or on command, from the tether and fly untethered for some predetermined amount of time before the drone battery runs out of power. The drone may return to the solar charging station and land on the platform 24 for recharge. The recharge may happen through the feet 71. The drone's connection to the tether and the platform 24 may have magnetic coupling power connections, like MagSafe® but with an electrical control that allows the magnet to attach and detach by electrical control signals. The attachment may be electromechanical where a spring or mechanical coupling is disconnected by controlling power to the coupling. While the drone and the tether may be automatically detached, reattachment will more than likely be manual.

Figure 2:
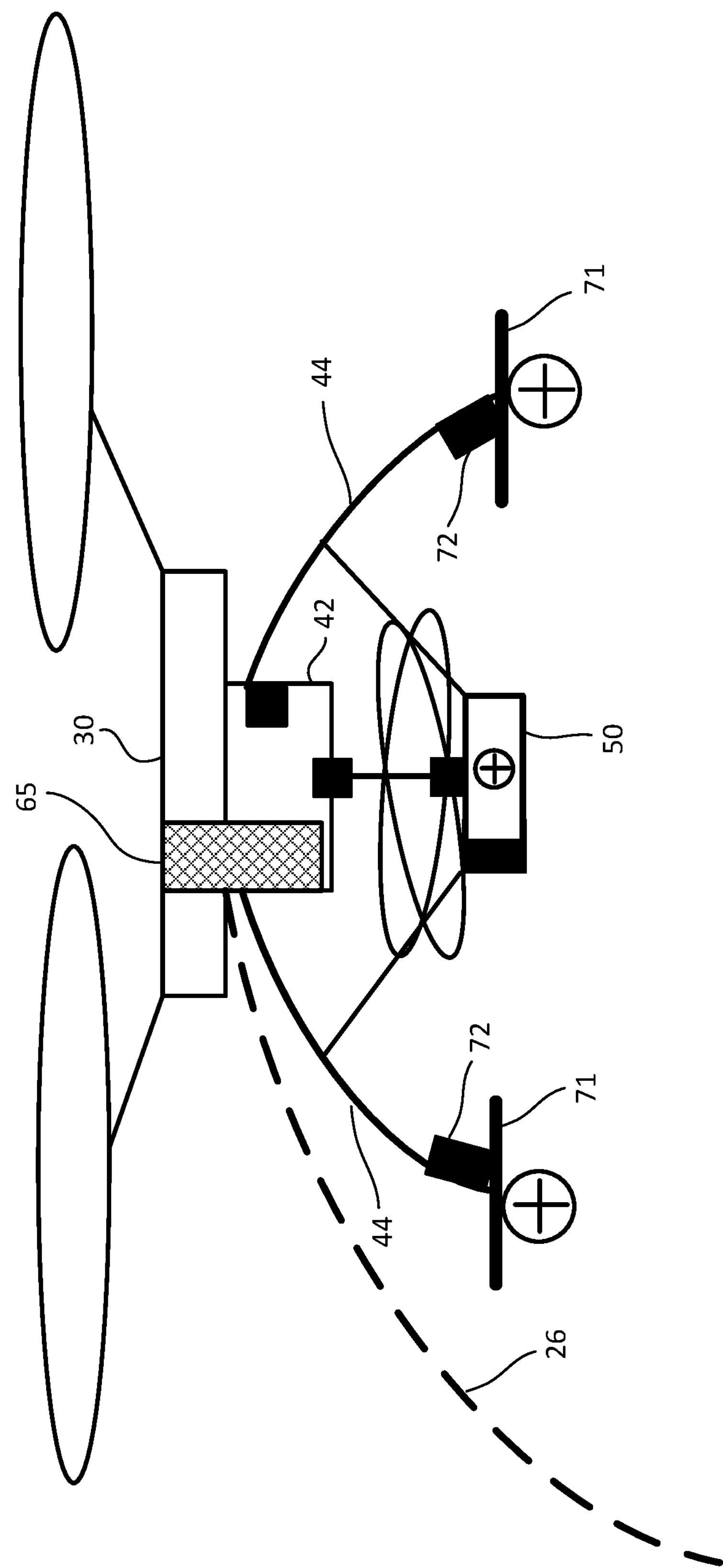
FIG. 2 shows an embodiment of a minibot drone launchable from a tethered drone.

FIG. 2 shows an embodiment of a mother drone and a minibot drone 50. The mother drone 30 has a camera, such as thermal or other type of camera. The cable 26 tethers the mother drone, and the minibot drone 50 detaches from the legs such as 44 of the mother drone. The minibot drones may deploy upon reception of something in the image data the requires a closer look, such as a lower altitude flight or a farther distance from the station than the tethered drone can reach.

The minibot drone attachments to the mother drone legs may include a power connection, a data connection or both. The minibot drones may communicate with the mother drone wirelessly, or through the connection, or they may connect with the mobile charging station directly. The minibot drones may deploy from the mother drone and run until they only have enough charge to land at the charging station. Alternatively, they could return to the mother drone and then either charge from the mother drone's attachments or ride the mother drone back to the station for charging.

Similarly, the charging or not of the minibots may rely upon the state of the mother drone. If the mother drone flies untethered, the minibots may not fly back to the mother drone. If the mother drone flies tethered, the minibots may return to the mother drone. This assists with power management in the mother drone and the minibot drones.

Figure 3:
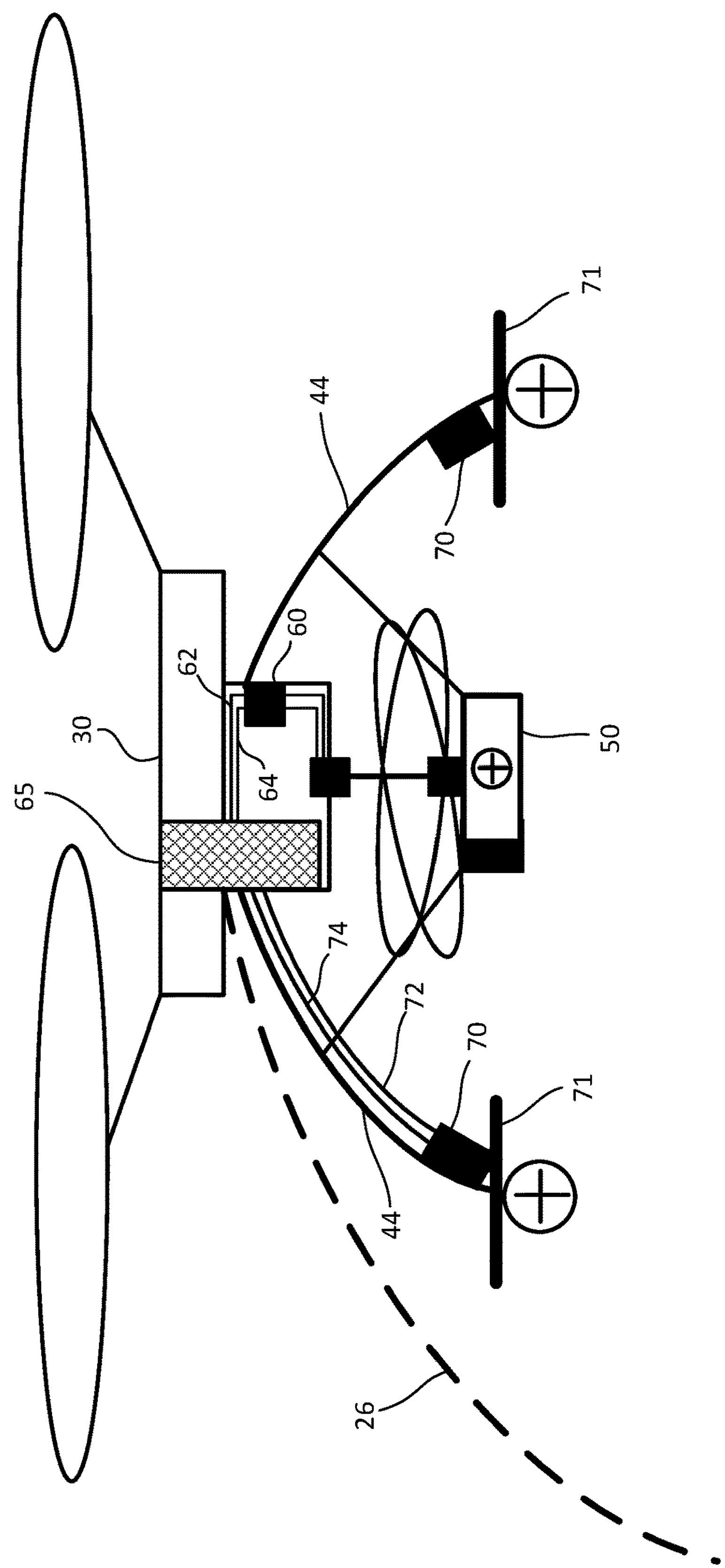
FIG. 3 shows an embodiment of a coupling attachment for a minibot drone back to a tethered mother drone.

FIG. 3 shows an embodiment of alternative types of connectors. In a first configuration, the drone 50 has a connector 68 connects to a connector 66 on the mother drone with a power connection 62 and a data connection 64. The minibot drone will typically reside under the mother drone to avoid affecting the aerodynamics of the mother drone. The distance should be sufficient that the propellers of the minibot drone have enough room to operate to allow the minibot to fly away. In addition, the propellers of the minibot drone should be configured to allow the connection to be made without interfering with the propellers.

Alternatively, especially if the system uses more than one drone, the drones may attach to the legs of the mother drone. The attachment 70 may be an electrically controlled magnetic attachment, or other contact type connection. The drone has a mating connector 70. The data and power connections 72 and 74 may run along the leg 44, to the mother drone 30. The controller 60 receives the power and data from the connections to the power and data connections.

Figure 4:
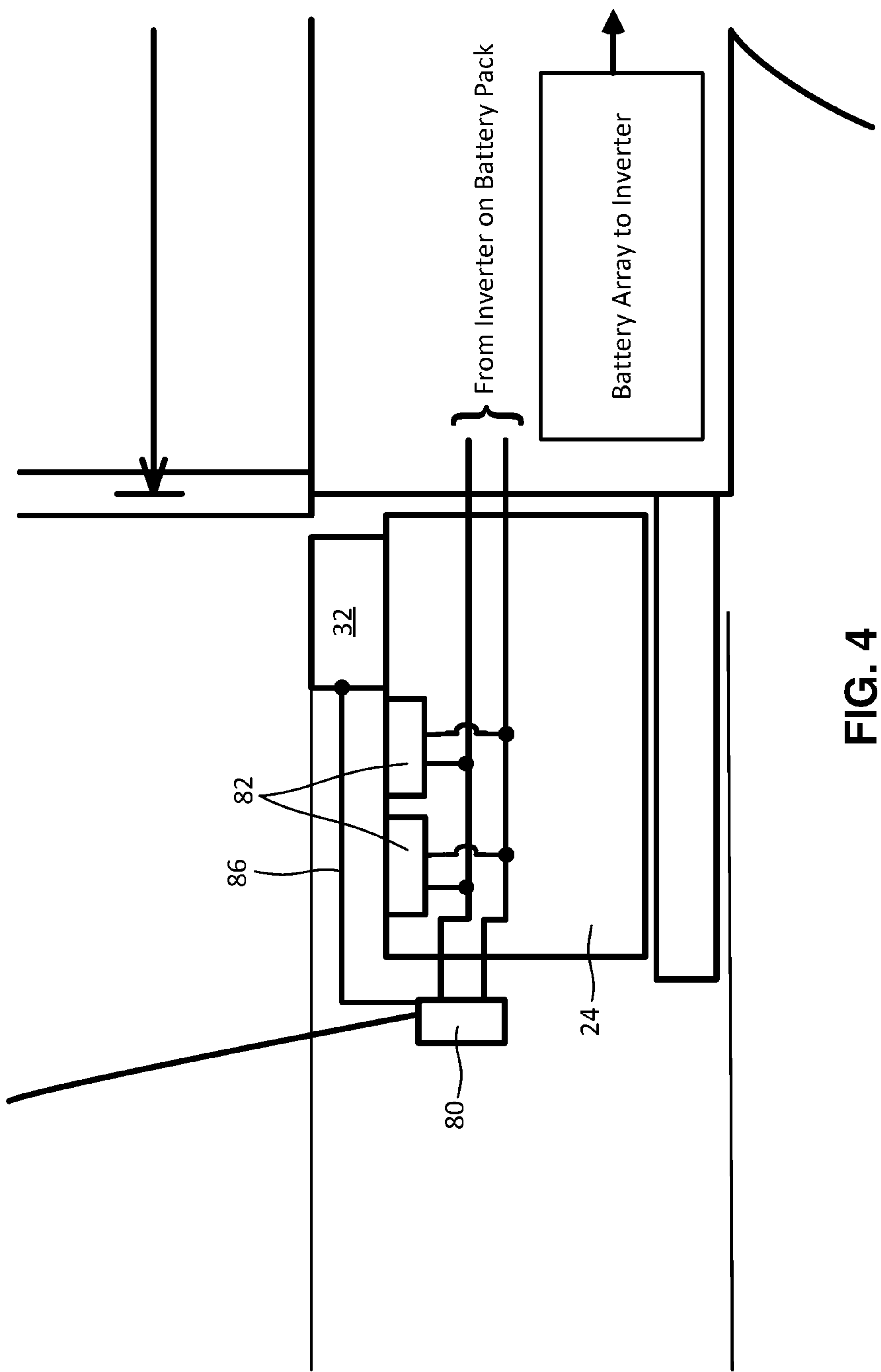
FIG. 4 shows an embodiment of a landing and recharging platform for a drone that has become untethered.

Similarly, the mother drone and/or the minibot drones can connect to a landing platform on the mobile charging station. FIG. 4 shows a more detailed view of the platform 24. As mentioned previously, the platform 24 includes a transmitter 32. In addition, the platform 24 has recharging connectors 80 and 82, that have power and data connectors 84 and 86. The recharging connectors may be any type of connector. The platform also provides power and data connection to the tether 26.

In addition to other agricultural applications, the solar powered, tethered drone with the trailer may serve as a remote storage and a signal relay for remote regions. For example, coconut growers in the Fiji Islands harvest in remote locations that are mountainous and isolated from each other. The copra, which is the coconut kernels, is typically dried in containers prior to being shipped to the grower's main site. One concern during the drying process is the introduction of aflatoxin, a mold that can enter the drying crops and render them useless.

Figure 5:
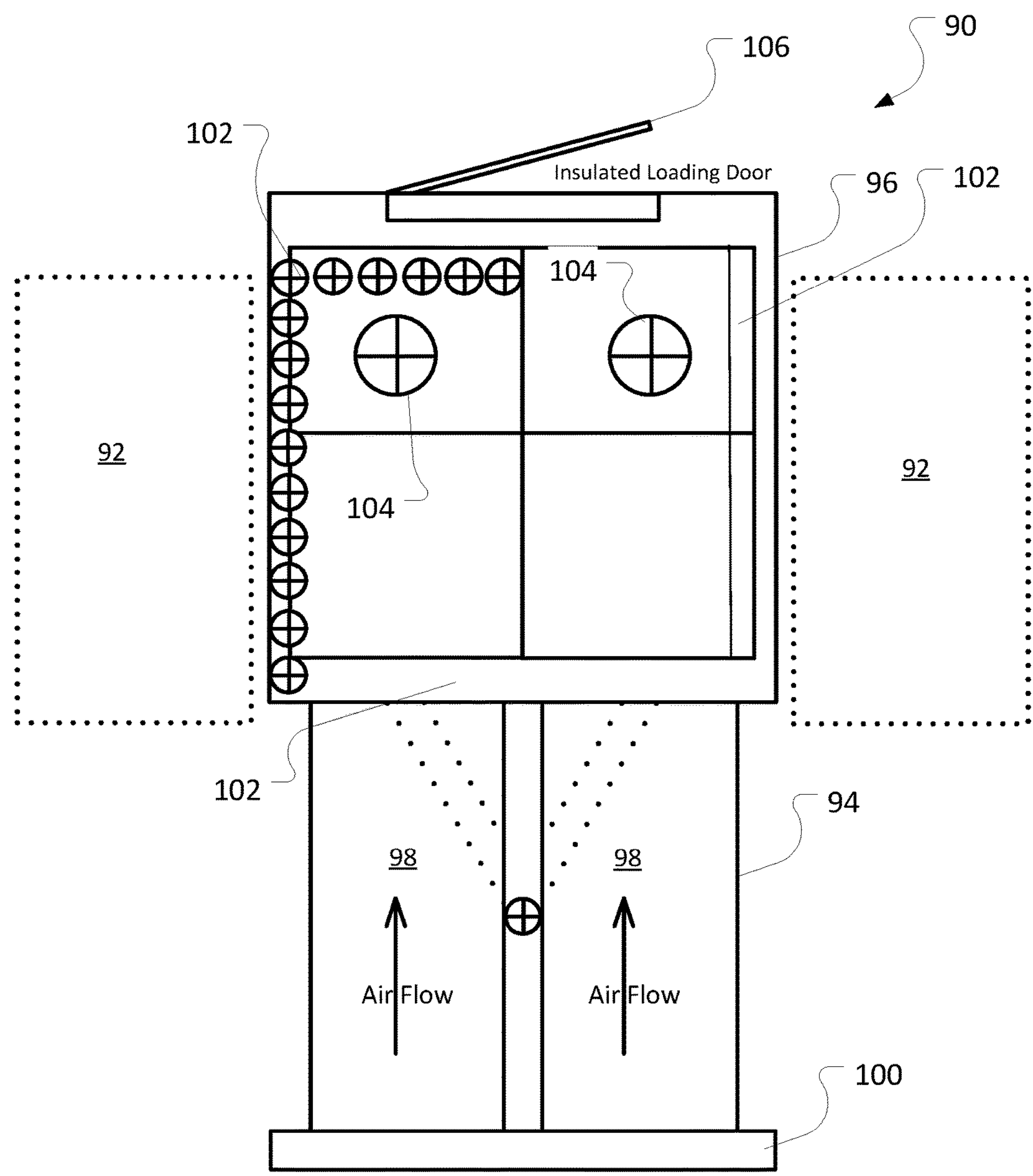
FIG. 5 shows an embodiment of a portable solar trailer acting as a storage container and RF relay.

FIG. 5 shows an embodiment 90 of a solar trailer having solar panels being used as a drying container for agricultural material. For simplicity, the tethered drone is not shown here, but the container will have a tethered drone. In addition, the drying container could just be a container, not part of a trailer, so will be referred to as a container here.

The container 90 has two portions, a first portion 96 that has tracking solar panels 92 that are unstacked from the center of the compartment, and a second portion 94 that is covered by removable solar panels 98. The tops of the two portions are closed, whether the solar panels are present or not. Air flows from the external environment through a filter 100 that blocks aflatoxins, germicides, etc., from reaching the copra. The first portion connects to the second portion through a duct connection under the lamp banks. The lamp banks 102 have lamps such as those shown that illuminate the drying copra. The lamps may consist of both a heat source and disinfectant source, such as that provided by ultraviolet (UV) light. Exhaust fans 104 move the air out of the container. Both the UV lights and the fans, or one or the other, may be solar powered from the energy converted from the solar panels.

In addition to providing power for a drying container, the solar panels provide power to the tethered drone, show in previous figures. The drone can fly above the container and provide better communication paths to other containers or the main site by reaching above hills or mountainsides that may interfere. With the data and communication capabilities of the drones, they can act as relays for other containers to allow transmission of data about the percentage of drying, the presence of toxins, etc., within in each container, where that information is gathered from sensors.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by these embodiments.

What is claimed is:

1. A mobile, powered monitoring system, comprising:
- an array of solar panels;
- a battery bank of at least one battery electrically connected to the array of solar panels;
- a landing and connection platform electrically connected to the battery bank;
- a cable electrically connected to the landing and connection platform;
- a drone electrically and mechanically connected to the cable, the drone having at least one camera; and
- a transmitter to allow images captured by the camera to be sent to a base station.

2. The mobile, powered monitoring system of claim 1, further comprising a trailer to which the array of solar panels mounts.

3. The mobile, powered monitoring system of claim 2, wherein the battery bank and landing and connection platform reside on the trailer.

4. The mobile, powered monitoring system of claim 1, further comprising a support to which the array of solar panels mounts, wherein the support allows the array of solar panels to move vertically.

5. The mobile, powered monitoring system of claim 1, wherein the drone further comprises at least one sensor.

6. The mobile, powered monitoring system of claim 5, wherein the sensor comprises at least one of a light sensor, a moisture sensor, a thermometer, and a microphone.

7. The mobile, powered monitoring system of claim 1, wherein the cable provides power and data connection for the drone.

8. The mobile, powered monitoring system of claim 1, wherein the landing and connection platform includes power and data connectors.

9. The mobile, powered monitoring system of claim 1, wherein the drone comprises a mother drone having at least one mini-bot drone.

10. The mobile, powered monitoring system of claim 9, wherein the mini-bot drone has at least one connector to allow the mini-bot drone to attach and detach from the mother drone.

11. The mobile, powered monitoring system of claim 9, wherein the mini-bot drone as power and data connectors with the mother drone.

12. The mobile, powered monitoring system of claim 1, wherein the transmitter resides on one of the drone, the landing and connection platform, or a trailer.

13. The mobile, powered monitoring system of claim 1, wherein the base station is one of the landing and connection platform, a remote base station, or the drone.

14. The mobile, powered monitoring system of claim 1, further comprising a storage container for drying agricultural material.

15. The mobile, powered monitoring system of claim 14, further comprising an air filter at end of the platform.

16. The mobile, powered monitoring system of claim 15, further comprising exhaust fans at an end of the platform opposite the end having the air filters, the exhaust fans arranged to pull air through the filter and pass the air through the agricultural material and then exhaust the air out of the container.

17. The mobile, powered monitoring system of claim 14, further comprising banks of lamps to provide heat to the drying agricultural products.

18. The mobile, powered monitoring system of claim 17, wherein the lamps comprise ultraviolet lamps.

19. The mobile powered monitoring system of claim 14, further comprising an insulated loading door.

* * * * *